US009231474B2

(12) United States Patent
Ooga

(10) Patent No.: US 9,231,474 B2
(45) Date of Patent: Jan. 5, 2016

(54) DC/DC CONVERTER AND DISPLAY DEVICE

(71) Applicant: NLT Technologies, Ltd., Kawasaki, Kanagawa (JP)

(72) Inventor: Kouichi Ooga, Kanagawa (JP)

(73) Assignee: NLT TECHNOLOGIES, LTD., Kanagawa (JP)

( * ) Notice: Subject to any disclaimer, the term of this patent is extended or adjusted under 35 U.S.C. 154(b) by 0 days.

(21) Appl. No.: 14/415,949

(22) PCT Filed: Jul. 8, 2013

(86) PCT No.: PCT/JP2013/068600
§ 371 (c)(1),
(2) Date: Jan. 20, 2015

(87) PCT Pub. No.: WO2014/017279
PCT Pub. Date: Jan. 30, 2014

(65) Prior Publication Data
US 2015/0180337 A1 Jun. 25, 2015

(30) Foreign Application Priority Data

Jul. 21, 2012 (JP) ................. 2012-162164

(51) Int. Cl.
*H05B 37/00* (2006.01)
*H02M 3/158* (2006.01)
*H02M 3/156* (2006.01)
*H05B 37/02* (2006.01)
*H02M 1/32* (2007.01)
*G09G 5/00* (2006.01)

(52) U.S. Cl.
CPC .............. *H02M 3/158* (2013.01); *H02M 3/156* (2013.01); *H05B 37/02* (2013.01); *G09G 5/003* (2013.01); *G09G 2330/00* (2013.01); *G09G 2330/06* (2013.01); *H02M 2001/327* (2013.01)

(58) Field of Classification Search
CPC ..... H02M 1/4208; H02M 3/156; H02M 1/38; H02M 1/44; H02M 2001/0009; H02M 2001/0025; H02M 3/07; H02M 3/157; H02M 3/1588; H02M 3/3155; H02M 3/335; H02M 3/3376; H02M 7/516; H02M 7/523; H02M 1/06
See application file for complete search history.

(56) References Cited

U.S. PATENT DOCUMENTS

2005/0259482 A1  11/2005  Hourai et al.

FOREIGN PATENT DOCUMENTS

| JP | 2004-260963 A | 9/2004 |
| JP | 2005-333768 A | 12/2005 |
| JP | 2009-225592 A | 10/2009 |
| JP | 2010-279150 A | 12/2010 |
| WO | 2006/098376 A1 | 9/2006 |

*Primary Examiner* — Douglas W Owens
*Assistant Examiner* — Monica C. King
(74) *Attorney, Agent, or Firm* — Sughrue Mion, PLLC

(57) ABSTRACT

There are provided a DC/DC converter and a display device. The DC/DC converter includes: an inductor connected to an input terminal; a switching element connected between the inductor and the earth; a diode connected between the inductor and an output terminal; a capacitor connected between the output terminal and the earth; a feedback circuit connected between the output terminal and the earth and outputting a feedback voltage; and an oscillating circuit performing an ON/OFF control of the switching element at a frequency corresponding to the received feedback voltage. The DC/DC converter further includes: a detection circuit which detects an external magnetic field and outputs a signal that is different depending on whether or not the detected magnetic field exceeds a predetermined threshold; and a control circuit performing a control of the DC/DC converter according to the signal, to suppress an overcurrent of the DC/DC converter in a strong magnetic field.

8 Claims, 12 Drawing Sheets

FIG. 11
RELATED ART
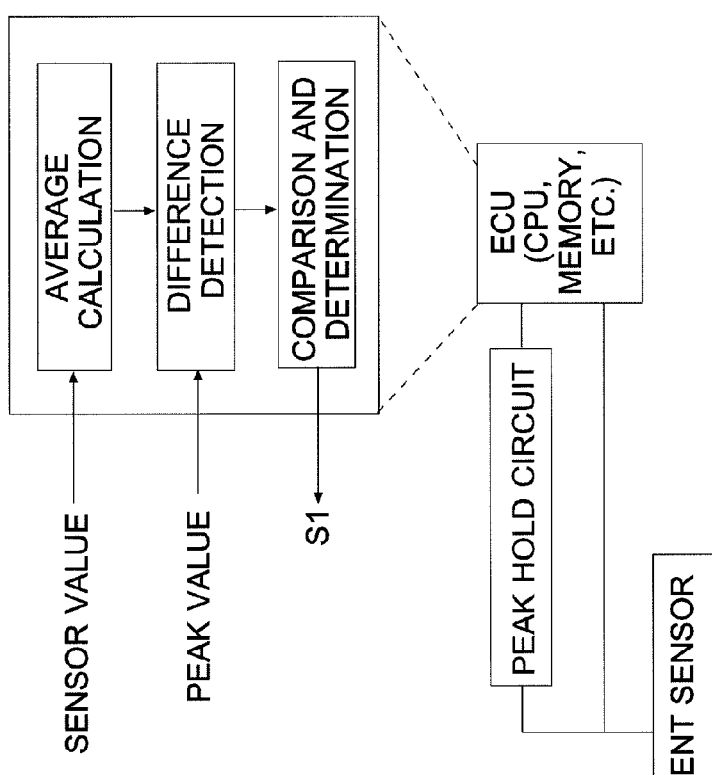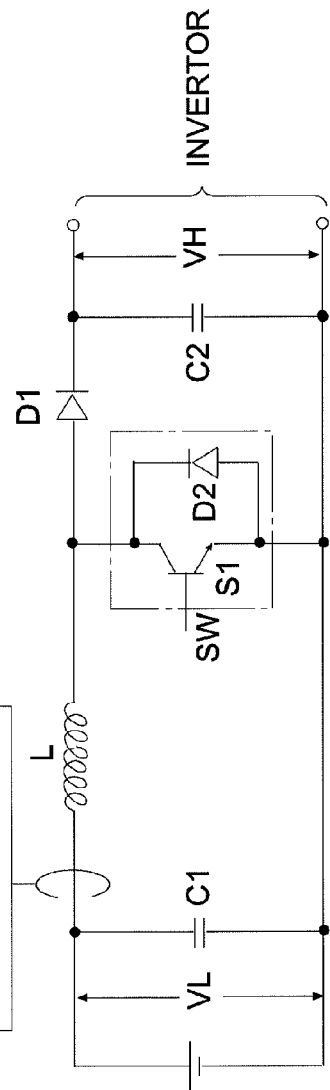

DC/DC CONVERTER AND DISPLAY DEVICE

CROSS REFERENCE TO RELATED APPLICATIONS

This application is a National Stage of International Application No. PCT/JP2013/068600 filed Jul. 8, 2013, claiming priority based on Japanese Patent Application No. 2012-162164, filed Jul. 21, 2012, the contents of all of which are incorporated herein by reference in their entirety.

TECHNICAL FIELD

The present invention relates to a DC/DC converter and a display device, and in particular to a DC/DC converter and a display device to be used in a strong magnetic field.

BACKGROUND ART

When installing a display device for medical purpose to be used as a monitor in, for example, an environment where a magnetic field generation device, such as an MRI (Magnetic Resonance Imaging system), is used, electronic parts that drive the display device might possibly cause malfunction due to changes of the surrounding magnetic field and perform operations that are not assumed. In particular, since an inductor included in a power supply circuit for driving the display device is directly affected by the surrounding magnetic field, the inductor may perform operations different from expected operations. This may cause the power supply circuit to malfunction. In addition, it can be considered that an integrated circuit (IC) is also affected by a magnetic field, and the integrated circuit may also perform operations different from expected operations.

In particular, a switching circuit is used for a voltage step-up circuit or a voltage step-down circuit as a component of a power supply circuit (DC/DC converter). The switching circuit is mainly constituted by an inductor, a field-effect transistor (FET), a rectifying diode, and a smoothing capacitor, and generates an output voltage having a voltage value different from an input voltage by converting the input voltage. Further, the DC/DC converter is provided with an overcurrent prevention circuit for preventing danger in electronic parts, such as heat and fire, when the output current becomes unusually large.

When a display device including a DC/DC converter having such a configuration is placed into a space where there is a strong magnetic field (referred to as "in a strong magnetic field"), the inductor is affected by the magnetic field to approach toward magnetic flux saturation. This causes increase of the current value. If the current value exceeds a threshold of the overcurrent prevention circuit, the DC/DC converter enters into a latch operation. If the latch operation is activated, the DC/DC converter halts the output. As a result, the display device halts and displays nothing. That is, when the display device is placed in a strong magnetic field, there is caused a problem that the display device stops suddenly as a result of changes of the surrounding magnetic field and there is needed an operation work to restore the stopped display device.

In order to avoid such a problem, for example, Patent Literature 1 identified below discloses a power conversion device including: an AC/DC converter for converting an AC voltage of an AC power source into a DC voltage; a smoothing capacitor for smoothing the DC voltage; a switching circuit which is constituted by a power transistor and converts the smoothed DC voltage into an AC voltage by performing an ON/OFF control of the power transistor; a PWM circuit which compares a command voltage with a carrier wave and outputs a control signal for performing the ON/OFF control of the power transistor of the switching circuit; and a comparator which determines whether or not there is magnetic flux saturation of a reactor for suppressing higher harmonic noise connected between the AC power source and the power conversion device and changes a switching frequency of the carrier wave when it is determined that there is magnetic flux saturation. This publication describes the following. In order to prevent the magnetic saturation of the reactor for suppressing higher harmonic noise, an inverter device that drives a motor with variable speed compares the magnetic flux detected by the magnetic flux detector with a pre-designated threshold level. If the magnetic flux exceeds that level, the inverter device decreases the oscillation frequency for controlling the power transistor of the power supply circuit in order to avoid a resonance frequency of an LC constituted by a reactor and a smoothing capacitor provided next to the reactor. After decreasing the oscillation frequency, the magnetic flux is detected again. If the magnetic flux is larger than a previous detected magnetic flux, the inverter device increases the oscillation frequency to change the oscillation frequency within a frequency domain where the reactor does not undergo magnetic saturation.

Incidentally, Patent Literature 2 identified below discloses a power control device for generating an electric power for driving an amplifier circuit that amplifies signals for transmission. The power control device includes: a generation means for generating a PWM signal using a maximum voltage value per unit time of a transmitting signal that should be outputted from the amplifier circuit according to the signal for transmission; a selection means; and a power generation means which includes a plurality of inductors including inductors having different inductance, for generating the electric power on the basis of the PWM signal by a chopper circuit that uses an inductor selected from among the plurality of inductors by the selection means. The selection means acquires a value reflecting the maximum voltage value, compares the value with a pre-set one or more thresholds, and selects an inductor to be used in the power generation means according to the comparison result. This publication describes providing two series of voltage step-up circuit lines in advance in the voltage step-up circuit, and changing the voltage step-up path (mainly an inductor) according to, for example, an output voltage value and load.

Incidentally, Patent Literature 3 identified below discloses a device including a reactor and a switching element, for use in a voltage converter that converts an input voltage into a predetermined output voltage by controlling the amount of current that passes the reactor with periodic switching control of the switching element. The device includes: a current detection section for sensing the amount of the current of the reactor; and a detection control section for sensing a change in capacitance of the reactor on the basis of a plurality of sensed values each obtained in the current detection section at a plurality of moments including a moment different from a center moment of an ON period or an OFF period of the switching element and one the basis of a reference value with respect to the sensed value when the capacity of the reactor has a predetermined value. This publication describes sensing the current when the reactor current increases as a result of, for example, deterioration of the reactor, and switching the switch OFF or reducing the SW period when there is a difference between the sensed electric current and that of a normal state (reference value).

Incidentally, Patent Literature 4 identified below discloses an actuator driving device for driving an electromagnetic actuator. The actuator driving device includes: a voltage step-up circuit for increasing a power supply voltage; and an increased voltage control means in downstream of the voltage step-up circuit. This publication describes monitoring the input voltage, and when the input voltage decreases, making the output voltage small by switching a feedback partial voltage resistance value of the voltage step-up section, and switching on and off the switch according to the determined result of the input voltage sensor.

Incidentally, Patent Literature 5 identified below discloses a chopper circuit including: two main reactors which are two separated body and constitute one reactor equivalently; a main switch including one pole connected to one end of the serially-connected main reactors and the other pole directly connected to one voltage terminal of a DC power supply; a serially-connected body of a snubber diode and a snubber capacitor, connected between both poles of the main switch; and an auxiliary switch connected between a junction point of the snubber diode and the snubber capacitor, and a junction point of the serially-connected two main reactors. The auxiliary switch makes the voltage of the snubber capacitor zero voltage, thereby, to make the voltage at the time of turning on the main switch zero voltage. This publication describes, with respect to ON/OFF timing of each switch, a soft switching operation that switches S2 ON slightly earlier than S1, and a regenerative operation that switches S2 ON simultaneous with S1 or later than S1.

CITATION LIST

Patent Literature

Patent Literature 1: JP-A No. 2004-260963
Patent Literature 2: JP-A No. 2009-225592
Patent Literature 3: JP-A No. 2010-279150
Patent Literature 4: JP-A No. 2005-333768
Patent Literature 5: WO 2006-098376 A

SUMMARY OF INVENTION

Technical Problem

As described above, when, under the situation that a display device is placed in a strong magnetic field, attempting to control the oscillation frequency using the power conversion device shown in FIG. 8 (FIG. 1 in Patent Literature 1) as in Patent Literature 1, there is provided an operation to decrease the oscillation frequency in Step S3 in the flowchart in FIG. 9 (FIG. 5 in Patent Literature 1) and an execution of the operation of Step S3 decreases the oscillation frequency and causes a latch operation, which is a problem.

Incidentally, in the configuration of Patent Literature 1, when the oscillation frequency is going to enter a domain where the resonance frequency of the LC circuit constituted by a ground capacitor and a common mode reactor for noise suppression is close to the switching frequency that drives the load, resonance occurs to cause amplification. Therefore, in order to avoid this, it is necessary to control the oscillation frequency so as to not approach to the resonance frequency of the LC circuit, which makes a problem that the control is complicated.

Incidentally, as shown in FIG. 10, in Patent Literature 2, there have been prepared two series of power source generation lines and the power source generation sections (e.g., coil, FET, and smoothing capacitor) are switched between when a load is large and when the load is small, to achieve a circuit in which power loss is reduced according to the load. However, with such a circuit configuration, it is necessary to always have two series of circuits and thus there is a problem that large circuit area and cost are needed.

Incidentally, as shown in FIG. 11, in Patent Literature 3, a change of the current value is monitored, and the SW control starts if a determination that there is a difference with the reference value has been given as a result of the monitoring. However, in this operation, the current value has already exceeded an acceptable value at the time of calculation and determination of the difference of the current value. Accordingly, the DC/DC converter may stop due to an overcurrent, for example, in the midst of the determination.

Incidentally, as shown in FIG. 12, Patent Literature 4 discloses a structure that the output part of the Hall element is not directly connected next to the switch (a gate of a transistor or an FET) and the determination of ON/OFF of the switch is made by monitoring only the input voltage. Therefore, a switch of this conventional example may not work in a strong magnetic field and the DC/DC converter may be halted due to an overcurrent.

Incidentally, as shown in FIG. 13, in Patent Literature 5, the output part of the Hall element is not connected next to the switch (a gate of a transistor or an FET) via a resistance and transistor. Therefore, the switch of this conventional example may not work in a strong magnetic field and the DC/DC converter may be halted as a result of a steady overcurrent rather than a spike-like change in voltage and current at the time of the turn-on/turn-off described in the conventional example.

Incidentally, there can be considered other methods such as a method of creating a shield so that the display device is not affected by a magnetic field even if the display device is put in a strong magnetic field, and a method of avoiding a use of components containing magnetic material. However, such methods increase the cost substantially.

The present invention has been made in view of the above problems. One main object is to provide a DC/DC converter and a display device that can avoid a shutdown of a DC/DC converter that causes a halt of the display device even when the display device is placed in a strong magnetic field.

Solution to Problem

To achieve the above object, one embodiment of the present invention is directed to a DC/DC converter comprising: an input terminal; and output terminal; an inductor whose one end is connected to the input terminal; a switching element connected between the other end of the inductor and the earth; a diode connected between the other end of the inductor and the output terminal; a capacitor connected between the output terminal and the earth; a feedback circuit connected between the output terminal and the earth, the feedback circuit outputting a feedback voltage obtained by dividing an output voltage of the DC/DC converter; and an oscillating circuit to which the feedback voltage is inputted, and which performs an ON/OFF control of the switching element at a frequency corresponding to the feedback voltage. The DC/DC converter further comprises: a detection circuit which detects an external magnetic field and outputs a signal that is different depending on whether or not the detected external magnetic field exceeds a predetermined threshold; and a control circuit to which the signal is inputted, and which perform a control of the DC/DC converter according to the signal, to suppress an overcurrent of the DC/DC converter in a strong magnetic field.

Advantageous Effects of Invention

According to the above-described DC/DC converter and the display device, it is possible to avoid a shutdown of the DC/DC converter that causes a halt of the display device even when the display device is placed in a strong magnetic field.

This is because the DC/DC converter includes: a strong magnetic field existence detection circuit which detects a magnetic field and outputs a signal that is different depending on whether or not the detected magnetic field exceeds a predetermined threshold; and a strong magnetic field existence latch operation avoidance circuit which performs a control such that the DC/DC converter does not enter into a latch operation when detecting a strong magnetic field, by increasing the oscillation frequency used for a ON/OFF control of the switching FET, increasing the inductance value by series connection with another inductor, or increasing the feedback voltage by isolating the resistance to be used for dividing the voltage, each according to the outputted signal.

Each of FIGS. 3A to 3D is a diagram showing control operations of the oscillation frequency in the DC/DC converter according to the first example of the present invention.

Figure 4:
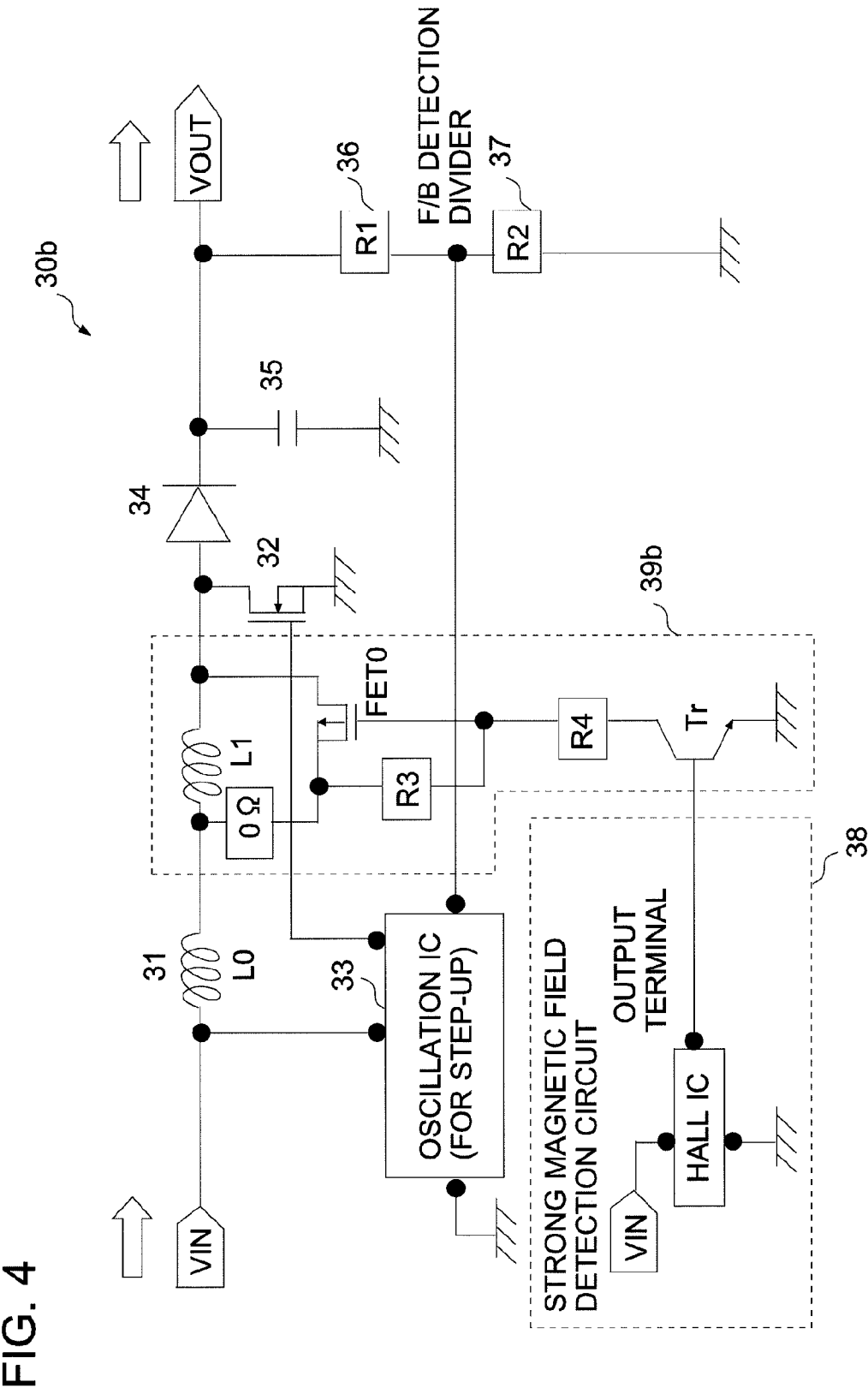

FIG. 4 is a block diagram showing a configuration of a DC/DC converter according to a second example of the present invention.

Each of FIGS. 5A to 5D is a diagram showing controlling operations of the inductance in the DC/DC converter according to the second example of the present invention.

Figure 6:
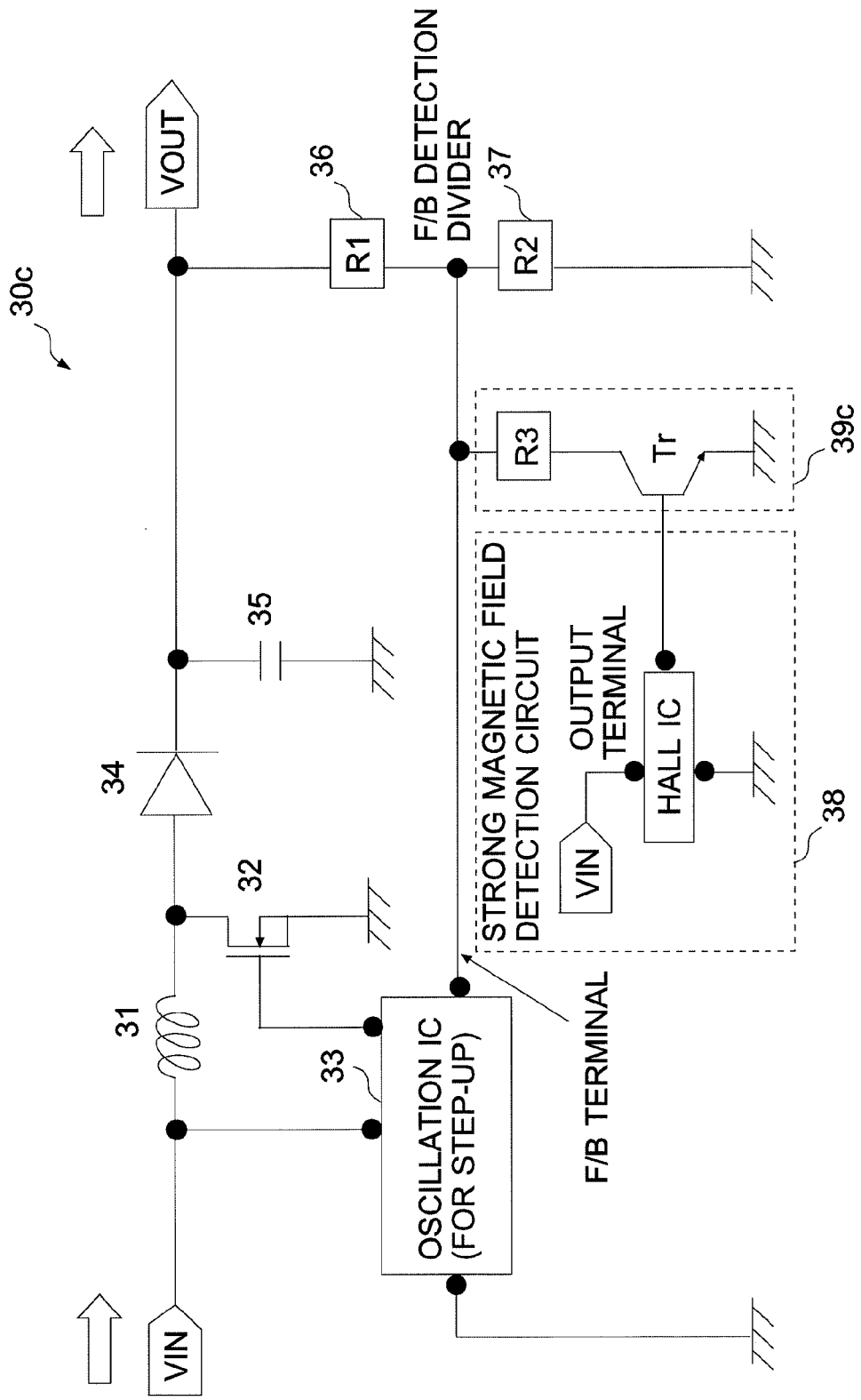

FIG. 6 is a block diagram showing a configuration of a DC/DC converter according to a third example of the present invention.

Each of FIGS. 7A to 7D is a diagram showing control operations of the feedback voltage in the DC/DC converter according to the third example of the present invention.

Figure 8:
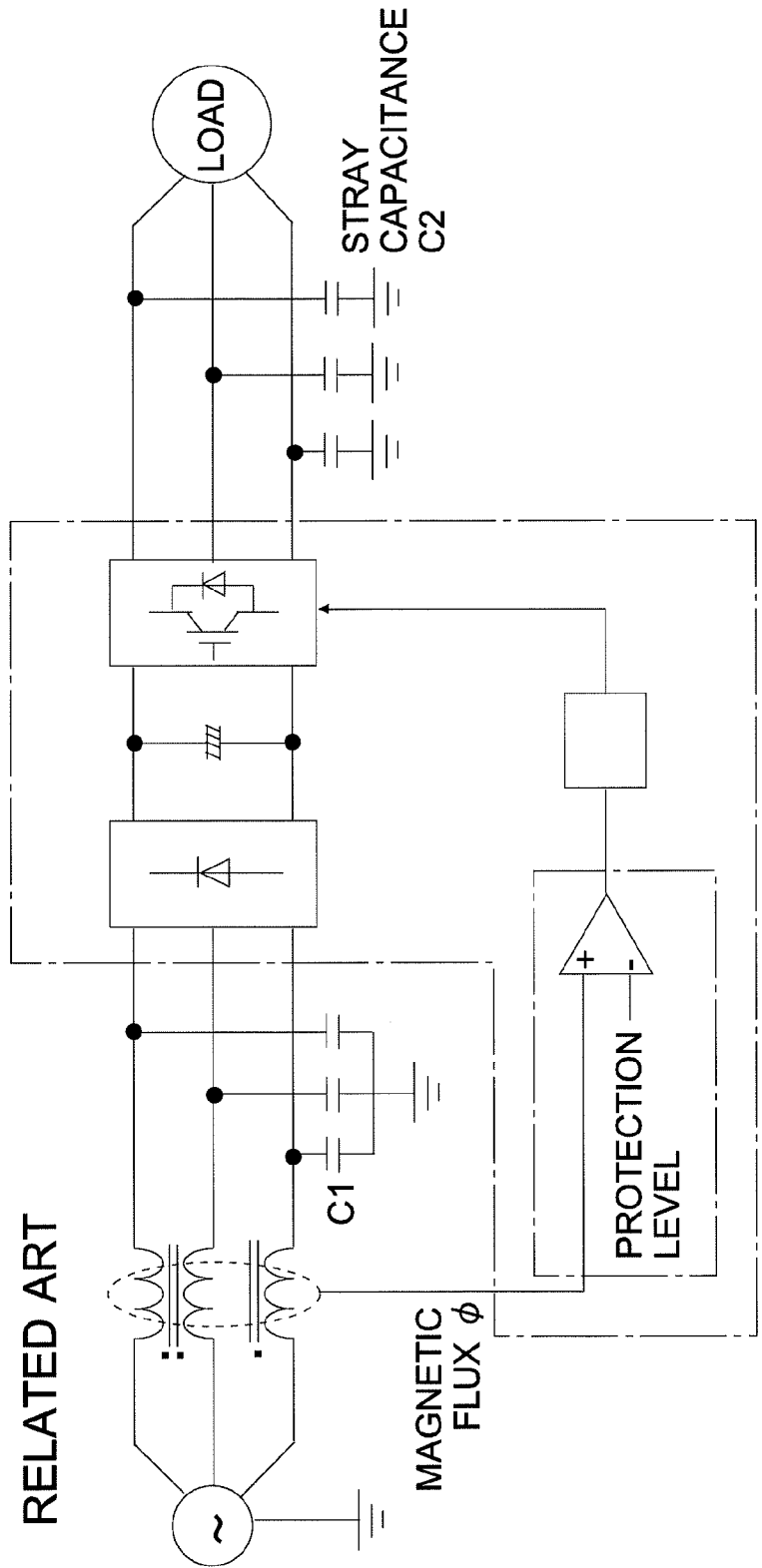

FIG. 8 is a diagram showing an example of a circuit configuration of a power converter of Patent Literature 1 (JP-A No. 2004-260963).

Figure 9:
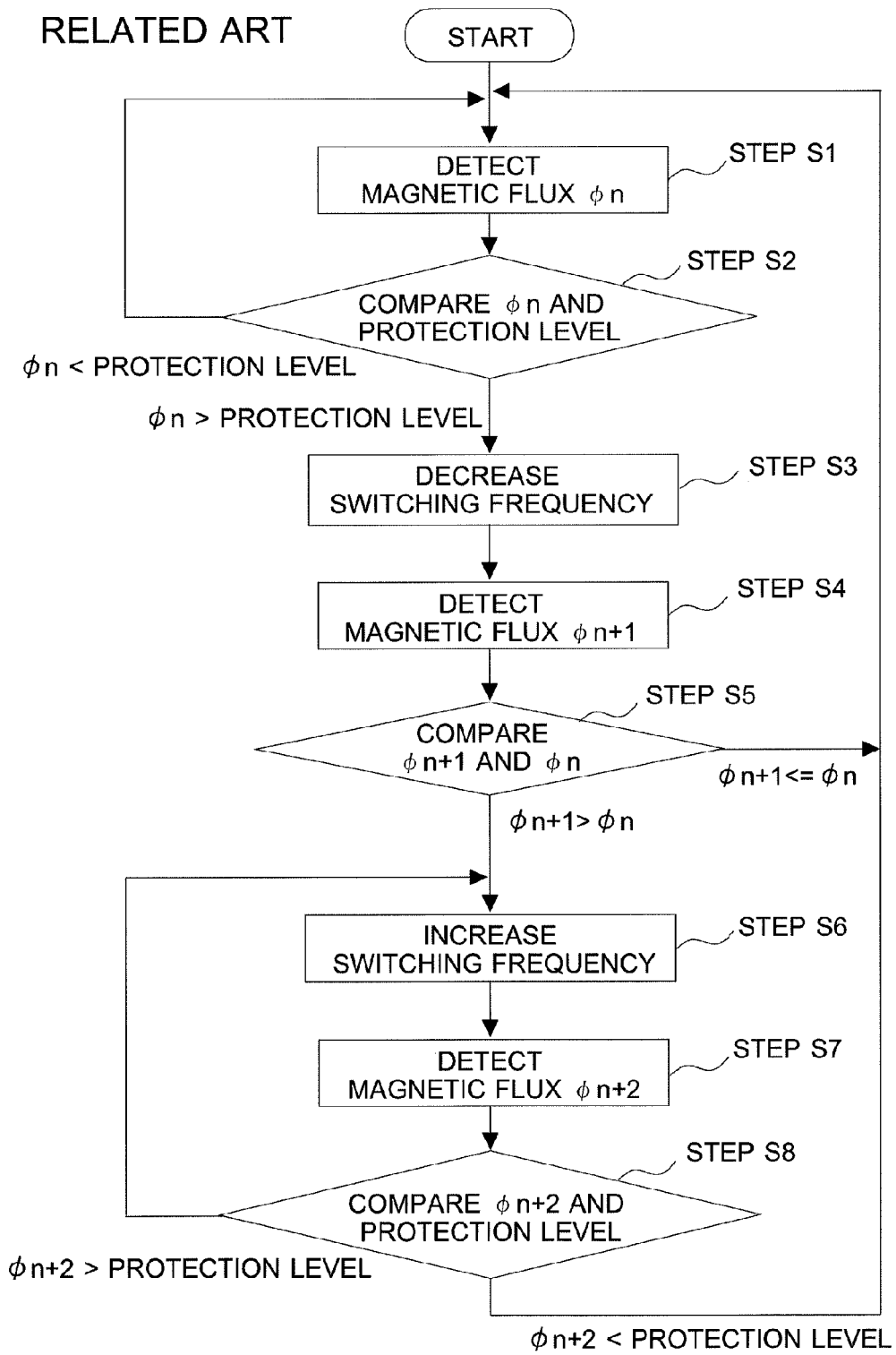

FIG. 9 is a diagram showing a circuit algorithm of a power converter of Patent Literature 1 (JP-A No. 2004-260963).

Figure 10:
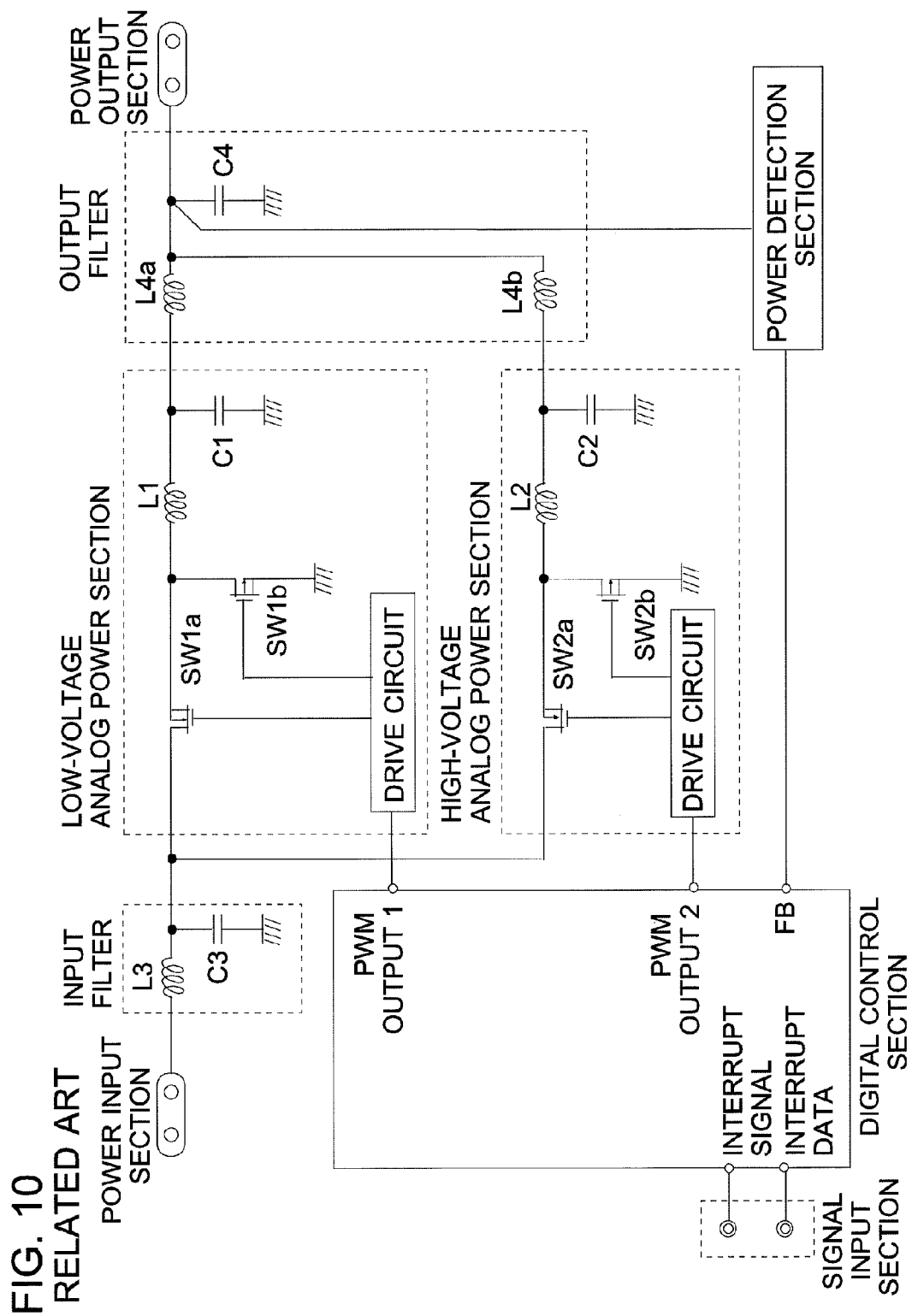

FIG. 10 is a diagram showing an example of a circuit configuration of a power controller of Patent Literature 2 (JP-A No. 2009-225592).

FIG. 11 is a diagram showing an example of a circuit configuration of a detection circuit of Patent Literature 3 (JP-A No. 2010-279150).

Figure 12:
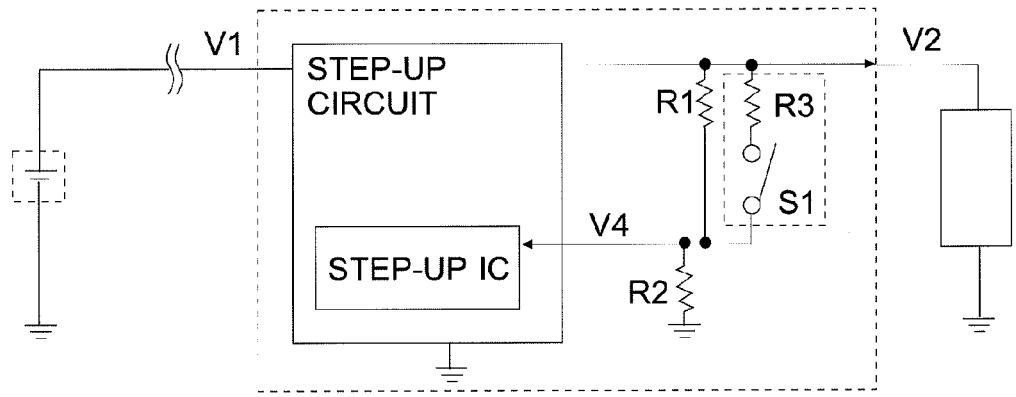

FIG. 12 is a diagram showing an example of a circuit configuration of an actuator drive unit of Patent Literature 4 (JP-A No. 2005-333768).

Figure 13:
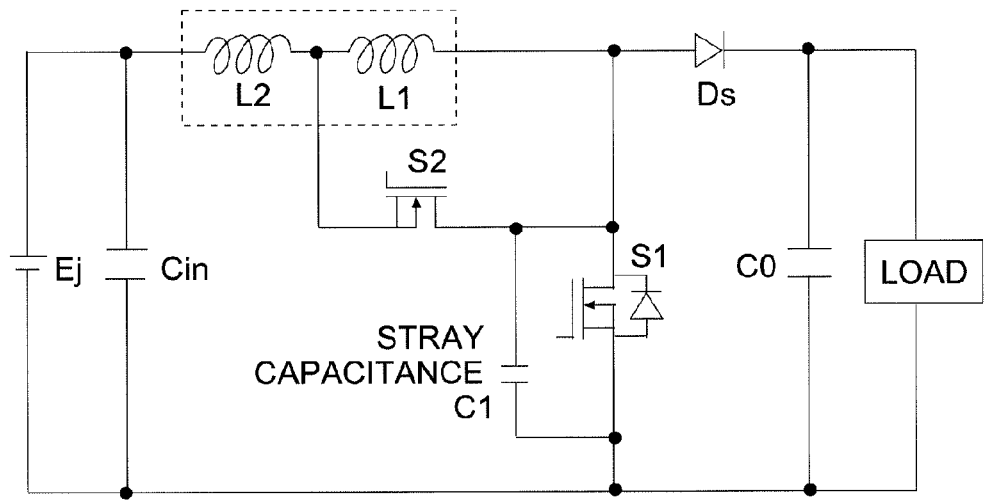

FIG. 13 is a diagram showing an example of a circuit configuration of a conventional chopper circuit (WO 2006-098376 A).

DESCRIPTION OF EMBODIMENTS

As described in Background Art, when a DC/DC converter having an inductor is placed in a strong magnetic field, a superfluous magnetic flux occurs in the inductor due to the external magnetic field, which causes an increase of the current value and results in an increase of the output current. Thus, there are cases where an overcurrent prevention circuit (latch circuit) provided in the DC/DC converter is activated. When the latch circuit is activated, the DC/DC converter turns off the output voltage (shut downs) after a certain period of time. Therefore, the display device does not display anything and switches to a halt state. It is necessary to turn on the power source again to restore the display device.

Various methods have been proposed with respect to this problem but none of the methods can prevent a shutdown of the DC/DC converter effectively. As alternative methods, one may think of methods such as a method of avoiding a use of components that are affected by a magnetic field as circuit components, and a method of providing a strong shield. However, the cost increases substantially in such methods.

Thus, a DC/DC converter according to the first embodiment of the present invention comprises: an input terminal; an output terminal; an inductor whose one end is connected to the input terminal; a switching element connected between the other end of the inductor and the earth; a diode connected between the other end of the inductor and the output terminal; a capacitor connected between the output terminal and the earth; a feedback circuit connected between the output terminal and the earth, and outputting a feedback voltage obtained by dividing an output voltage of the DC/DC converter; and an oscillating circuit to which the feedback voltage is inputted, and which performs an ON/OFF control of the switching element at a frequency corresponding to the feedback voltage. The DC/DC converter further comprises: a detection circuit which detects an external magnetic field and outputs a signal that is different depending on whether or not the detected external magnetic field exceeds a predetermined threshold; and a control circuit to which the signal is inputted, and which performs a control of the DC/DC converter according to the signal, to suppress an overcurrent of the DC/DC converter in a strong magnetic field. This can provide a circuit configuration such that the display device does not halt even when placed in a strong magnetic field. That is, it can provide a circuit configuration so as avoid the DC/DC converter from shutdown.

Specifically, the circuit configuration includes: a strong magnetic field existence detection circuit which detects that the location is in a strong magnetic field; and a strong magnetic field existence latch operation avoidance circuit that performs a control such that the DC/DC converter does not activate the latch operation when detecting that the location is in a strong magnetic field. For example, the strong magnetic field existence detection circuit is configured using a Hall element (Hall IC) which switches output logic (Hi or Low) by responding to the strength and weakness of the surrounding magnetic field. Further, for example, the strong magnetic field existence latch operation avoidance circuit is configured using a circuit that changes the generative operations of the output voltage of the DC/DC converter according to the output state of the Hall IC (e.g., oscillation frequency control circuit, an inductance control circuit, and a feedback voltage control circuit).

Example 1

Figure 1:
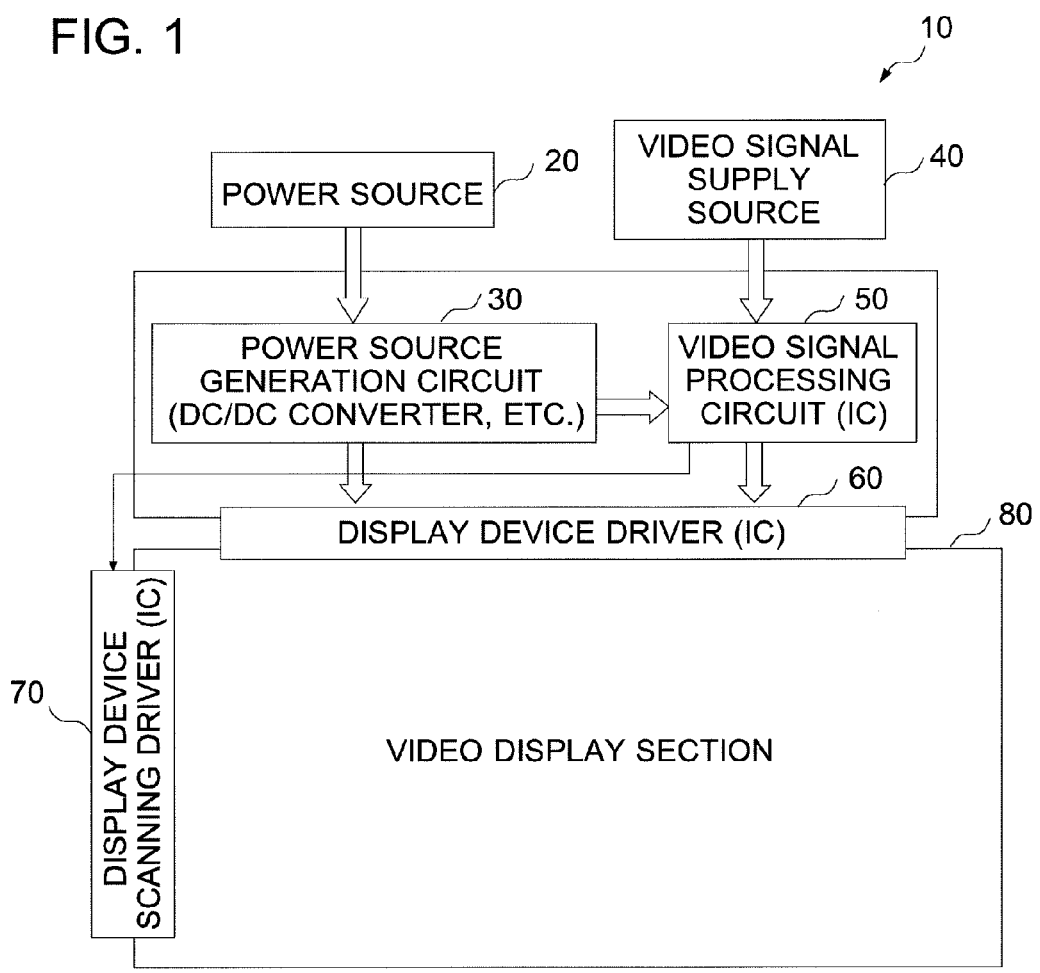
FIG. 1 is a block diagram showing an overall configuration of a display device according to a first example of the present invention.
Figure 2:
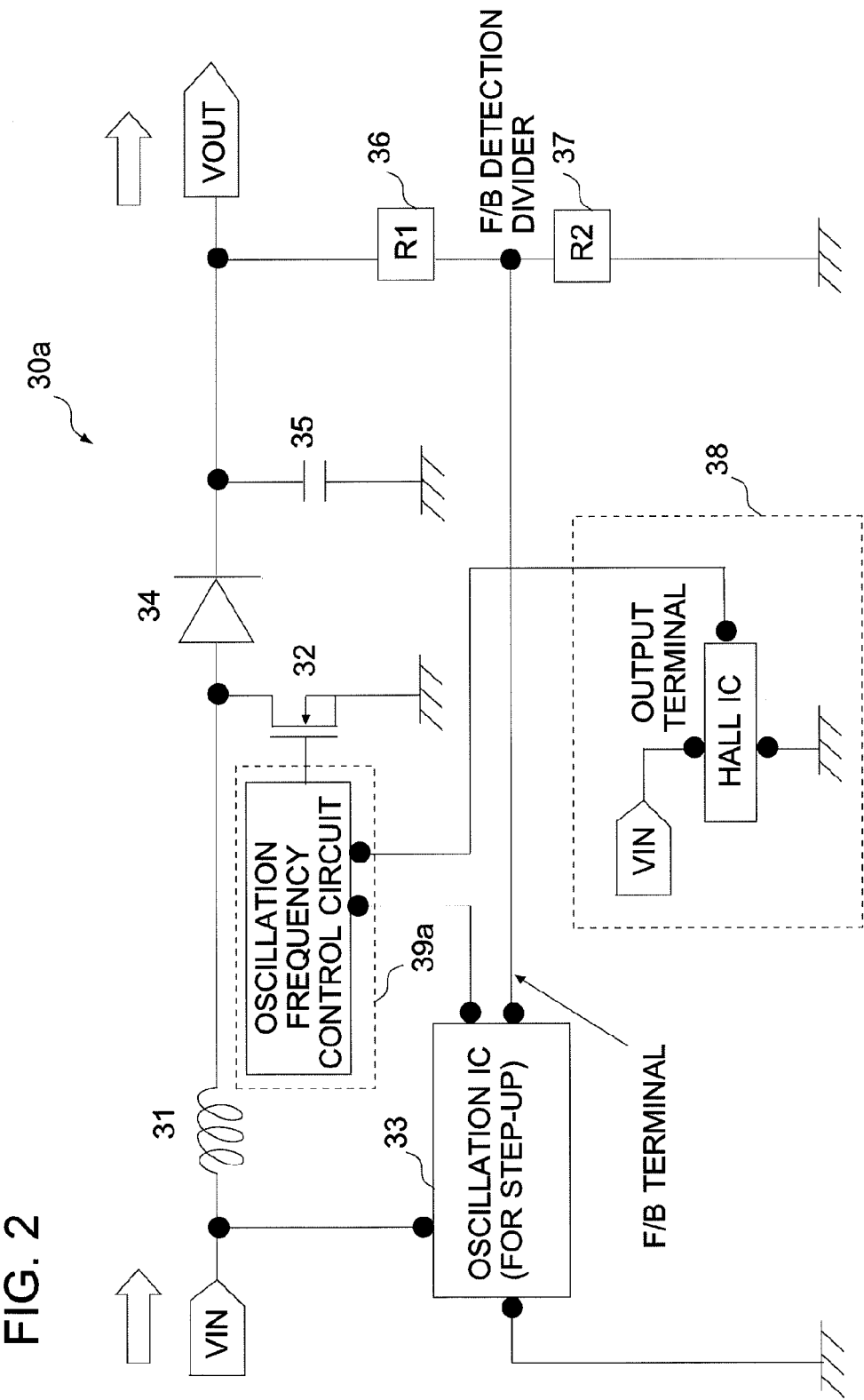
FIG. 2 is a block diagram showing a configuration of a DC/DC converter according to the first example of the present invention.
Figure 3:
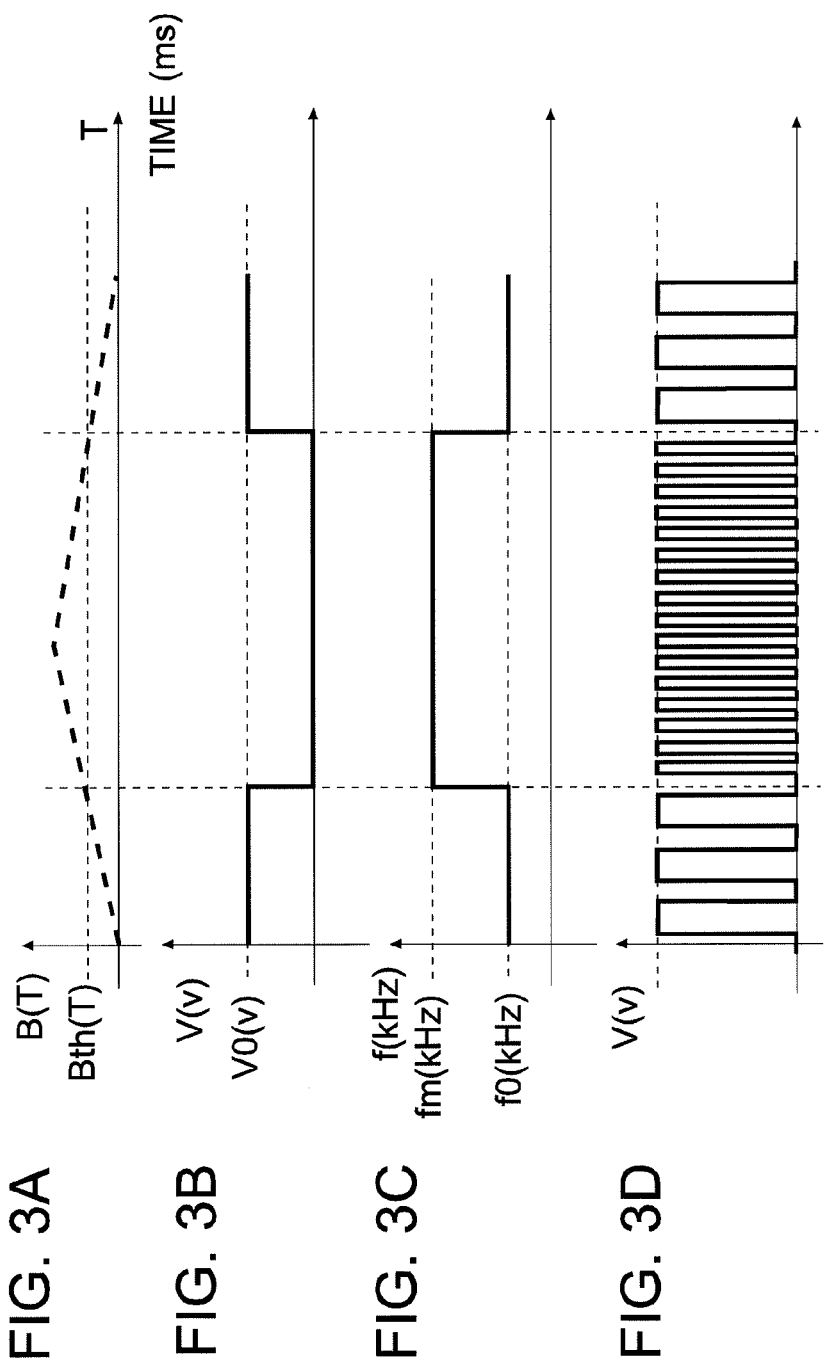

With reference to FIGS. 1-3, there will be given descriptions of a DC/DC converter and a display device according to the first example of the present invention, for illustrating the above embodiments of the present invention in detail. FIG. 1 is a block diagram showing a configuration of the display device of the present example. FIG. 2 is a block diagram showing a configuration of the DC/DC converter of the present example. In addition, FIGS. 3A-3D are diagrams showing control operations of the oscillation frequency in the DC/DC converter.

As shown in FIG. 1, the display device 10 of the present example includes: a power source 20 such as a battery; a power source generation circuit 30 such as a DC/DC converter; a video signal supply source 40 which supplies video signals; a video signal processing circuit 50 such as an IC for processing video signals; a display device driver 60 such as an IC for driving the display device; a display device scanning driver 70 such as an IC for scanning with the display device; and a video display section 80 such as an LCD which displays a video image.

In the display device 10, an inductor is used in the power source generation circuit 30. Since this inductor can malfunction under the influence of a magnetic field, the power source generation circuit 30 in the present example is configured as shown in FIG. 2 in a way that the power source generation circuit 30 works normally even in a strong magnetic field. First, as an example of the power source generation circuit 30, fundamental operations of the DC/DC converter 30a will be described now.

The DC/DC converter 30a, when an input voltage VIN is inputted thereto, charges energy with the inductor 31, opens a gate of a switching FET 32 at intervals of a period determined by an oscillation IC 33, creates a voltage higher than the input by repeating ON and OFF of a voltage step-up line, rectifies in the rectifier diode 34 so that the electric current flows in one way, and obtains a stabilized voltage through a smoothing capacitor 35 to output the resulting voltage as an output voltage VOUT. Furthermore, the DC/DC converter 30a always monitors the output voltage such that the output voltage does not exceed the assumed voltage, returns the partial voltage value of the output voltage to the oscillation IC 33 as a feedback (F/B) voltage which is determined by a resistance 36 and a resistance 37 (feedback detection divider in FIG. 2), monitors the output voltage value with an error amplifier which is located in the oscillation IC 33, and adjusts the output voltage such that the output voltage decreases when the output voltage becomes high, and the output voltage increases when the output voltage becomes low, to provide a circuit configuration through which a predetermined fixed voltage can always be obtained.

Here, when a DC/DC converter 30a is placed in a field where a strong magnetic flux that exceeds, for example, several mT (millitesla) (not intended to limit the numerical value of the strong magnetic flux), is impressed by a component other than components that constitute the DC/DC converter 30a (exterior of the DC/DC converter) (hereafter referred to as "in a strong magnetic field"), an inductor 31 used for the voltage step-up switching and the voltage step-down switching of the DC/DC converter 30a is affected by an external magnetic field, showing a tendency of magnetic flux saturation. Such a tendency of magnetic flux saturation is accompanied by a decrease of the inductance value of the inductor 31. A decrease of the inductance value means that energy sufficient for generating output voltage is no longer stored in the inductor 31. Sufficient energy cannot be maintained until when the next ON/OFF drive starts after the ON/OFF operation of the switching FET 32, resulting in a decrease of the voltage. Thus, an abnormality is recognized in the feedback circuit of the DC/DC converter 30a, causing the latch circuit being activated. As a result, a display device 10 becomes a halt state and suddenly no image is displayed on the screen.

In view of this problem, before being in a state where the output voltage cannot be maintained with the energy stored in the inductor 31 until the timing of the next ON/OFF operation of the switching FET 32 upon the DC/DC converter 30a being placed in a strong magnetic field and the inductance value of the inductor 31 decreasing, the ON/OFF timing of the switching FET 32 advances to an earlier timing. Thus, the switching operation is continued and output voltage can be maintained. That is, it is advantageous if the oscillation frequency at the time when a strong magnetic field is detected is increased in order to maintain an output voltage.

In the present example, in order to avoid the display device 10 from being in a halt state even when placed in a strong magnetic field, the DC/DC converter 30a includes: an strong magnetic field existence detection circuit 38 which detects a strong magnetic field; and an strong magnetic field existence latch operation avoidance circuit which, in response to a detection of the strong magnetic field, performs a control such that the DC/DC converter 30a does not start a latch operation. In particular, when receiving a signal to be outputted when the strong magnetic field existence detection circuit 38 detects a magnetic field that exceeds a threshold, the strong magnetic field existence latch operation avoidance circuit performs control so as to increase the frequency used for the ON/OFF control of the switching FET 32.

The strong magnetic field existence detection circuit 38 can be constituted using a component, such as a Hall element (Hall IC), that switches the output logic (Hi or Low) in response to the strength and weakness of the surrounding magnetic field. On the other hand, the strong magnetic field existence latch operation avoidance circuit can be constituted using an oscillation frequency control circuit 39a which controls the oscillation frequency of the DC/DC converter 30a by using output logic (Hi or Low) of the Hall IC.

It should be noted that a Hall IC may be of a digital output type or an analog output type (e.g., linear Hall IC) and the type of the Hall IC is not limited. However, a linear Hall IC which is controllable with an analog value is more suitable in order to achieve fast operations. Further, the detection of the magnetic field is not limited to the Hall IC. It may be done by a device or a component that can sense the strength of a magnetic field and switch the output logical state according to the strength of the magnetic field.

Operations in a case where the strong magnetic field existence detection circuit 38 and the oscillation frequency control circuit 39a are employed will be described now. With respect to specifications of the operations of the Hall IC, the Hall IC has a Hi level output in an environment where there are no or very small external magnetic field, and works and has a Low level output when placed in a strong magnetic field that exceeds a fixed threshold. The oscillation frequency control circuit 39a determines the output level of the Hall IC. If the output level is Hi level, the oscillation frequency control circuit 39a drives the switching FET 32 at an oscillation frequency f0 (kHz) of a usual drive. If the output level is Low level, the oscillation frequency control circuit 39a switches the oscillation frequency to a frequency fm that satisfies the following Ex. 1.

$$f0 < fm < f\text{max} \qquad \text{Ex. 1}$$

Here, as given in Ex. 2 described later, the value of fmax should have a value smaller than a reciprocal of the sum of turn ON time (Ton) and turn OFF time (Toff) of the switching FET 32 upon driving the FET. This is because, when driving the switching FET 32, an attempt to drive the switching FET 32 with a frequency exceeding a reciprocal of the sum of the turn ON time and the turn OFF time of the FET, results in a drive in a domain that the switching FET 32 does not make a sufficient ON/OFF response as a switching operation of the FET, and therefore a usual switching operation is no longer performed.

$$f\text{max} < 1/(T\text{on} + T\text{off}) \quad \text{Ex. 2}$$

The above-described operation will be described specifically now using FIGS. 3A-3D. Under an environment without an external magnetic field (when the magnetic flux density B(T) in FIG. 3A does not exceed a threshold (Bth) of the Hall element), the output logic of the Hall IC (refer to output V(v) of the strong electromagnetic field existence detection circuit in FIG. 3B) is at the Hi level, and the oscillation frequency control circuit 39a conducts a ON/OFF drive on the switching FET 32 of the DC/DC converter 30a at an oscillation frequency f0 (refer to FIG. 3C) and thus the switching FET 32 is driven normally (refer to FIG. 3D).

Meanwhile, when the DC/DC converter 30a is placed in a strong magnetic field (here, when the magnetic flux density B(T) in FIG. 3A exceeds the threshold (Bth) of the Hall element), an external magnetic field is detected by the strong magnetic field existence detection circuit 38, and the oscillation frequency control circuit 39a increases the value of oscillation frequency for the ON/OFF drive of the switching FET 32 (f(kHz) in FIG. 3C) so as to have a value of fm, to increase the number of times of switching ON/OFF of the switching FET 32 (see the waveform of V(v) in FIG. 3D). Thereby, a decrease of the output voltage due to a decrease of the inductance value of the inductor 31 affected by the external magnetic field is prevented and the activation of the latch circuit is avoided.

In this way, when the strong magnetic field existence detection circuit 38 and the oscillation frequency control circuit 39a are provided in the DC/DC converter 30a and the strong magnetic field existence detection circuit 38 detects a magnetic field exceeding the threshold, the oscillation frequency control circuit 39a changes the oscillation frequency for driving the switching FET 32 to fm that is greater than f0 at the time of a usual drive and smaller than a reciprocal of the sum of the turn ON time and the turn OFF time, and thus it is possible to prevent a decrease of the output voltage. Therefore, it is possible to avoid an output halt and a sudden shutdown of the display device 10 even when the DC/DC converter 30a is placed in a strong magnetic field.

Further, driving the switching FET 32 always at a high oscillation frequency can cause a switching loss (efficiency deterioration of the DC/DC converter 30a) due to an increase in the number of times of the switching. Therefore, it is possible to achieve an efficient DC/DC converter by increasing the oscillation frequency only during a minimum time period required, that is, only when the device is in a strong magnetic field, and when the external magnetic field has disappeared, returning to the oscillation frequency of a usual drive.

It should be noted that the Hall IC, in the above description, gives a Hi output when there is no external magnetic field and a Low output in a strong magnetic field but a Hall IC of an open drain type may be used for the Hall IC.

Example 2

Next, a DC/DC converter and a display device according to a second example of the present invention will be described now with reference to FIG. 4 and FIGS. 5A-5D. FIG. 4 is a block diagram showing a configuration of a DC/DC converter of the present example. FIGS. 5A-5D are diagrams showing control operations of an inductance in the DC/DC converter.

In the above first example, the activation of the latch circuit resulting from a decrease of the inductance value of the inductor 31 is suppressed by using the oscillation frequency control circuit 39a as a strong magnetic field existence latch operation avoidance circuit and by increasing the oscillation frequency used for driving the switching FET 32 in a strong magnetic field. However, in the present example, the activation of a latch circuit is suppressed by controlling the inductance. Specifically, there is employed an inductance control circuit including: a second switching element; a second inductor which is connected to the inductor 31 in series when the second switching element is either ON or OFF; and a transistor which performs an ON/OFF control of the second switching element. If the transistor receives a signal to be outputted at the time when the strong magnetic field existence detection circuit has detected a magnetic field exceeding a threshold, the inductance control circuit performs a control to connect the inductor 31 and the second inductor in series to increase the inductance value.

The configuration in this case is as shown in FIG. 4. The DC/DC converter 30b includes: an strong magnetic field existence detection circuit 38 which detects an existence of a strong magnetic field; and an inductance control circuit 39b (strong magnetic field existence latch operation avoidance circuit) that changes an inductance value used in the voltage step-up (step-down) line of the DC/DC converter according to the output state of the Hall IC. The inductance control circuit 39b includes: an inductor L1; and circuit elements (e.g., transistor, switching FET, and resistance) which control whether or not to perform a connection of the inductor L1 according to the output of the Hall IC.

It should be noted that the basic configuration of the display device 10 and the DC/DC converter is the same as that of the first example. Further, the configuration of the strong magnetic field existence detection circuit 38 is the same as that of the first example. The Hall IC may be of a digital output type or an analog output type (e.g., linear Hall IC) and the type of the Hall IC is not limited. However, a linear Hall IC controllable by an analog value is suitable in order to achieve fast operations. Further, the detection of the magnetic field is not limited to the Hall IC. It may be done by a device or a component that can sense the strength of a magnetic field and switch the output logical state according to the strength.

Operations in a case where the strong magnetic field existence detection circuit 38 and the inductance control circuit 39b are employed will be described now. With respect to specifications of the operations of the Hall IC, similarly to the first example, the Hall IC has a Hi level output in an environment where there are no or very small external magnetic field, and works and has a Low level output when placed in a strong magnetic field that exceeds a fixed threshold. The inductance control circuit 39b determines the output level of the Hall IC. If the output level is Hi, the inductance control circuit 39b drives the Hall IC using only the inductor L0 for the usual drive. If the output level is Low, the DC/DC converter 30b is driven with a configuration where the inductor L1 is added to the inductor L0.

The above operations will be specifically described now using FIGS. 5A-5D. Under an environment without an external magnetic field (here, when the magnetic flux density B(T) in FIG. 5A does not exceed the threshold (Bth) of the Hall element), the output logic of the Hall IC (output V(v) of the strong magnetic field existence detection circuit in FIG. 5B) is at a Hi level and a transistor (Tr) connected to an output terminal of the Hall IC is at an ON state. Here, FET0 is set to ON due to an electric potential divided by resistances R3 and R4 and an electric current does not flow into the inductance L1. Accordingly, the DC/DC converter 30b is driven only by the inductor 31 of L0 (refer to L(μH) in FIG. 5C and I(A) in FIG. 5D).

Figure 5:
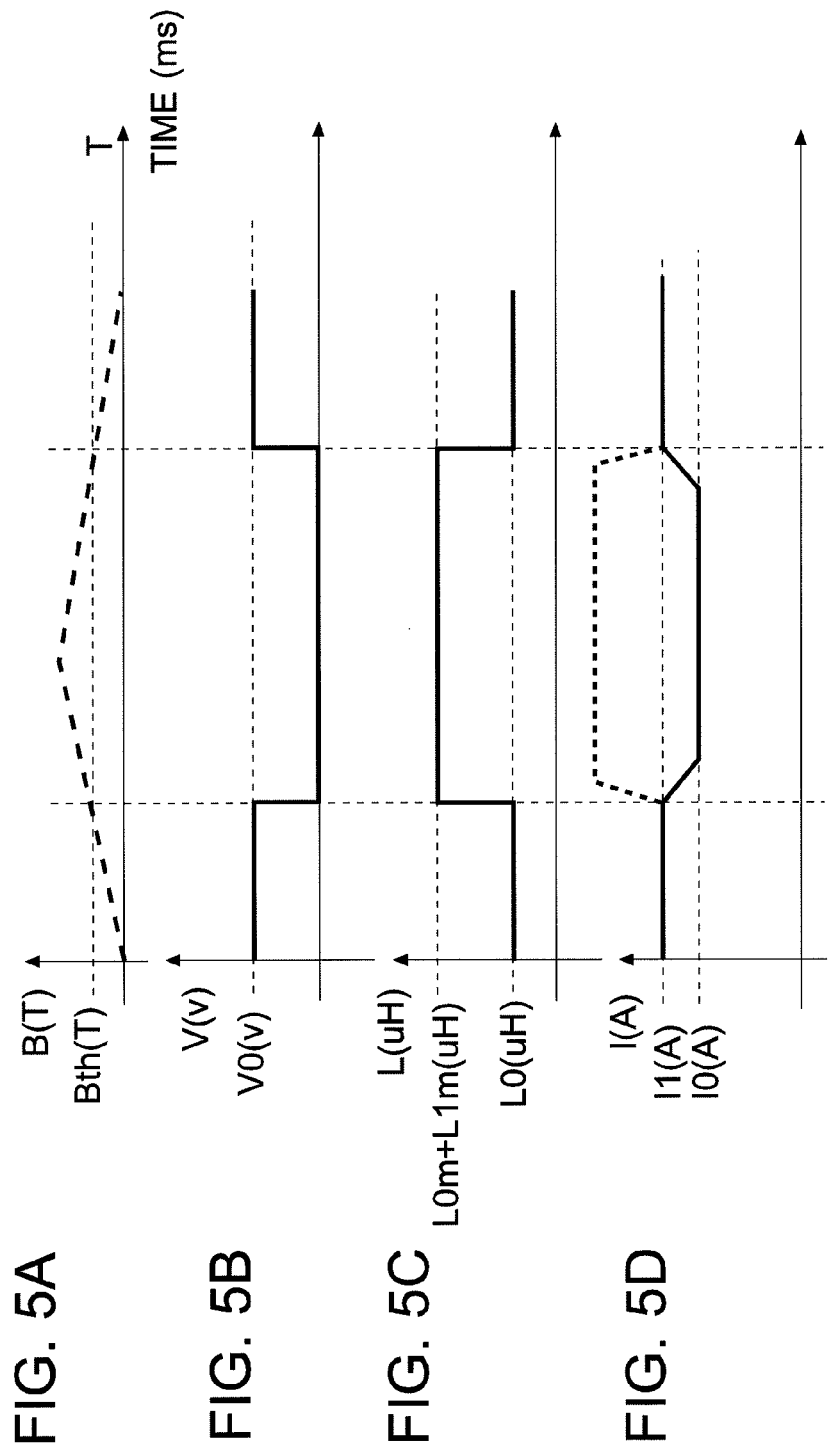

Meanwhile, when the DC/DC converter 30b is placed in a strong magnetic field (here, when the magnetic flux density B(T) in FIG. 5A exceeds the threshold (Bth) of a Hall element), an external magnetic field is detected by the strong magnetic field existence detection circuit 38 and the output logic of the Hall IC becomes Low, and thus the transistor Tr connected to an output terminal of the Hall IC becomes an OFF state. Thereby, R3 and R4 has the same electric potential and FET0 switches to an OFF state. Accordingly, the DC/DC converter 30b is driven in a configuration where the inductors L0 and L1 are added together (refer to L(μH) in FIG. 5C and I(A) in FIG. 5D).

Here, as for the inductor 31 which drives the DC/DC converter 30b, the inductance value is greater when the drive is conducted with the inductors L0 and L1 rather than only with the inductor L0. Accordingly, sufficient energy is stored for maintaining the output voltage, and activation of the latch circuit can be avoided by preventing a decrease of the output voltage.

It should be noted that, in a strong magnetic field, precisely, the inductor trends towards magnetic flux saturation under the influence of the external magnetic field, and therefore the inductance value is decreased in comparison with the total inductance value of the inductors L0 and L1. Therefore, as shown in the following Ex. 3, it is preferable to work on the constants in advance such that the reduced inductance value corresponds to an inductance value of a usual state.

$$L0 \sim L0m + L1m \qquad \text{Ex. 3}$$

where
"~" represents nearly equal;
L0 is an inductance value of the inductor L0 when there is no external magnetic field;
L0m is an inductance value of the inductor L0 in a strong magnetic field; and
L1m is an inductance value of the inductor L1 in a strong magnetic field.

As just described, the strong magnetic field existence detection circuit 38 and the inductance control circuit 39b are provided in the DC/DC converter 30a. When the strong magnetic field existence detection circuit 38 detects a magnetic field exceeding the threshold, the inductor of the inductance control circuit 39b is added to increase the inductance value, and thus a decrease of the output voltage can be prevented. Accordingly, there is caused no output halt even when the DC/DC converter 30a is placed in a strong magnetic field and thus it is possible to avoid a sudden shutdown of the display device 10.

Example 3

Next, a DC/DC converter and a display device according to a third example of the present invention will be described now with reference to FIG. 6 and FIGS. 7A-7D. FIG. 6 is a block diagram showing a configuration of the DC/DC converter of the present example. FIGS. 7A-7D are diagrams showing control operations of the feedback voltage in the DC/DC converter.

In the above first example, the activation of the latch circuit resulting from a decrease in the inductance value of the inductor 31 is suppressed by increasing the oscillation frequency used for driving the switching FET 32 in a strong magnetic field. In the second example, the activation of the latch circuit is suppressed by increasing the value of the inductance in a strong magnetic field. However, in this example, the activation of the latch circuit is suppressed by controlling the feedback voltage. To be more precise, there is provided a feedback voltage control circuit including: a resistance whose one end is connected to an output path of the feedback voltage; and a transistor connected between the other end of the resistance and the earth. When the transistor receives a signal to be outputted when a strong magnetic field existence detection circuit detects a magnetic field exceeding a threshold, the resistance is invalidated and control is performed to lower the output voltage of the DC/DC converter.

The configuration in this case is shown in FIG. 6, where the DC/DC converter 30c includes: an strong magnetic field existence detection circuit 38 which detects an existence of a strong magnetic field; and a feedback voltage control circuit 39c (strong magnetic field existence latch operation avoidance circuit) that changes the output voltage generation operation of the DC/DC converter 30c according to the output state of the Hall IC. The feedback voltage control circuit 39c includes: a resistance R3; and a circuit element (e.g., transistor) which controls connection/disconnection of the resistance R3 according to the output of the Hall IC.

It should be noted that the basic configuration of the display device 10 and the DC/DC converter is the same as that of the first and second examples. Further, the configuration of the strong magnetic field existence detection circuit 38 is the same as that of the first and second examples. The Hall IC may be of a digital output type or an analog output type (e.g., linear Hall IC) and the type of the Hall IC is not limited. However, in order to achieve fast operations, a linear Hall IC which can be controlled by analog values is more suitable. Further, detection of a magnetic field is not limited to that of a Hall IC. It may be done by a device or a component that can sense the strength of a magnetic field and switch the output logical state according to the strength.

First, the feedback voltage will be described. The output voltage VOUT is divided with resistances R1 and R2 to obtain a voltage value (Vf/b) and Ex. 4 below is obtained. By inputting the voltage value to the feedback terminal of oscillation IC 33, a fixed output voltage value can be obtained. Furthermore, as per the specifications of the oscillation IC 33, the feedback voltage is determined in the oscillation IC 33 such that the feedback voltage always has a constant voltage value (referred to as Vf/bic), and the output voltage value is adjusted according to the value.

$$Vf/b = VOUT \times (R2)/(R1+R2) \qquad \text{Ex. 4}$$

When expressing in an expression specifically, Vf/bic is always a constant value. Therefore, when there is no feedback voltage control unit 39c, the current value (If/b) flowing through the feedback resistance portion is determined by Ex. 5 below and the same electric current also flows in R1. Thus, VOUT is as shown in Ex. 6 below and Ex. 7 is obtained from Ex. 5 and Ex. 6.

$$If/b = Vf/bic/R2 \qquad \text{Ex. 5}$$

$$VOUT = (R1+R2) \times If/b \qquad \text{Ex. 6}$$

$$VOUT = Vf/bic \times (R1+R2)/R2 = Vf/bic \times (1+(R1/R2)) \qquad \text{Ex. 7}$$

As can be seen from Ex. 7, the output voltage increases when the value of R2 decreases and the output voltage decreases when the value of R2 increases.

Here, there is given a consideration about a case where the feedback voltage control unit 39c of the present example is employed. The Hall IC is designed to have a Hi level output when there is no external magnetic field. Accordingly, the transistor Tr (assumed to be an NPN transistor) connected to the output terminal of the Hall IC is in an ON state and resistance of R3 in parallel with R2 is synthesized. To be more specific, the formula of VOUT of a conventional configuration (a case that there is no feedback voltage control unit 39c) can be expressed by the following Ex. 8.

$$VOUT = Vf/bic \times (1 + (R1 \times ((1/R2) + (1/R3)))) \quad \text{Ex. 8}$$

Figure 7:
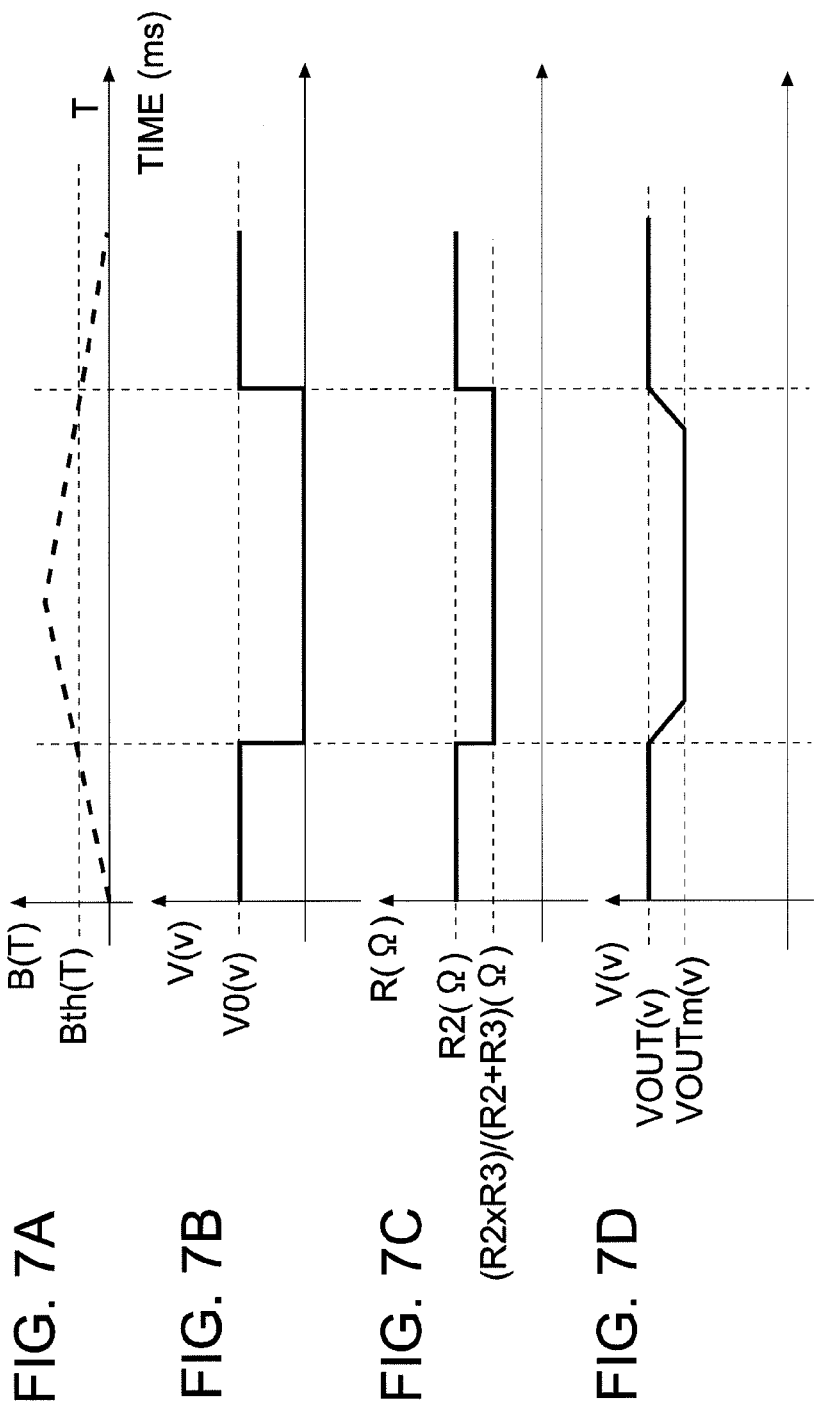

As shown in FIGS. 7A-7D, first, a value of VOUT obtained by Ex. 8 is set to an output voltage value (V(v) in FIG. 7D) under an environment without an external magnetic field (when the magnetic flux density B(T) in FIG. 7A does not exceed a threshold (Bth) of the Hall element, in this case). Next, when the environment is changed to an environment in a strong magnetic field (when the magnetic flux density B(T) in FIG. 7A exceeds the threshold (Bth) of the Hall element, in this case), the Hall IC detects this and has a Low level output (refer to output V(v) of the strong electromagnetic field detection circuit in FIG. 7B). Therefore, the transistor Tr connected to the output terminal of the Hall IC becomes an OFF state. More specifically, R3 becomes invalid and only R2 involves with the feedback voltage (refer to R (Ω) in FIG. 7C). Thus, the output voltage is expressed by the following Ex. 9.

$$VOUTm = Vf/bic \times (1 + (R1 \times (1/R2))) \quad \text{Ex. 9}$$

where VOUTm is an output voltage value in a case where the DC/DC converter is placed in a strong magnetic field.

Comparing VOUT with VOUTm results in VOUT>VOUTm. Accordingly, it can be recognized that the output voltage obtained under a strong magnetic field has decreased as compared to a case where there is no external magnetic field (refer to V(v) in FIG. 7D).

In such manner, the decrease of the output voltage value reduces the current value of a voltage step-up line of the DC/DC converter 30c, which allows the current value to be controlled so as not to exceed the shutdown threshold current of the DC/DC converter 30c. Accordingly, even when the display device provided with the feedback voltage control circuit 39c of the present example is placed in a strong magnetic field, it is possible to avoid a problem of the DC/DC converter 30c being shut down and the display device suddenly displaying no image.

In the above, the Hall IC is assumed to be designed to have a Hi output when there is no external magnetic field and a Low output in a strong magnetic field. However, when using a Hall IC that has a Hi-Z (OPEN) output when there is no external magnetic field and a Low output in a strong magnetic field, the transistor Tr connected to the output terminal of the Hall IC becomes unnecessary (the strong magnetic field existence detection circuit 38 and the feedback voltage control circuit 39c can be constituted with only the Hall IC and one resistance). Thus, it is possible to reduce the number of components.

It should be noted that the present invention is not limited to the above examples. As long as not deviating from the spirit of the present invention, the configuration and control can be modified as appropriate. For example, though a voltage step-up type DC/DC converter has been described in the above examples, the present invention can also be applied similarly to a voltage step-down type DC/DC converter.

INDUSTRIAL APPLICABILITY

The present invention is applicable to a DC/DC converter, and in particular to a DC/DC converter used in a strong magnetic field and a display device that employs such a DC/DC converter as a power generation circuit.

REFERENCE SIGNS LIST

10: display device
20: power source
30: power source generation circuit
30a, 30b, 30c: DC/DC converter
31: inductor
32: switching FET
33: oscillation IC
34: rectifier diode
35: smoothing capacitor
36, 37: resistance
38: strong magnetic field existence detection circuit
39: strong magnetic field existence latch operation avoidance circuit
39a: oscillation frequency control circuit
39b: inductance control circuit
39c: feedback voltage control circuit
40: video signal supply source
50: video signal processing circuit
60: display device driver
70: display device scanning driver
80: video display section

The invention claimed is:

1. A DC/DC converter comprising:
an input terminal;
an output terminal;
an inductor whose one end is connected to the input terminal;
a switching element connected between the other end of the inductor and an earth;
a diode connected between the other end of the inductor and the output terminal;
a capacitor connected between the output terminal and the earth;
a feedback circuit connected between the output terminal and the earth, the feedback circuit outputting a feedback voltage obtained by dividing an output voltage of the DC/DC converter;
an oscillating circuit to which the feedback voltage is inputted, the oscillating circuit performing an ON/OFF control of the switching element at a frequency corresponding to the feedback voltage;
a detection circuit which detects an external magnetic field and outputs a signal that is different depending on whether or not the detected external magnetic field exceeds a predetermined threshold; and
a control circuit to which the signal is inputted, the control circuit performing a control of the DC/DC converter according to the signal, to suppress an overcurrent of the DC/DC converter in a strong magnetic field.

2. The DC/DC converter of claim 1, wherein
the control circuit performs a control to increase the frequency of the ON/OFF control of the switching element, in response to input of a certain signal thereto, the certain signal being outputted from the detection circuit when the detection circuit detects a magnetic field exceeding the threshold.

3. The DC/DC converter of claim 2, wherein
the control circuit performs the control such that the frequency fm of the ON/OFF control of the switching element satisfies:

$$f0 < fm < 1/(Ton + Toff),$$

where f0 is a frequency at which the switching element is driven when there is no or very small external magnetic field, Ton is turn-ON time of the switching element, and
Toff is turn-OFF time of the switching element.

4. The DC/DC converter of claim 1, wherein
the control circuit includes:
- a second switching element;
- a second inductor connected to the inductor in series when the second switching element is in an ON or OFF state; and
- a transistor which performs an ON/OFF control of the second switching element, and the control circuit performs a control to connect the inductor and the second inductor in series to increase an inductance value of the DC/DC converter, in response to input of a certain signal to the transistor, the certain signal being outputted from the detection circuit when the detection circuit detects a magnetic field exceeding the threshold.

5. The DC/DC converter of claim 4, wherein
the second inductor is configured such that L0 and Lm are substantially the same,
where L0 is an inductance value of the inductor when there is no or very small external magnetic field, and
Lm is a total sum of the inductance value of the inductor and the inductance value of the second inductor when the external magnetic field exceeds the threshold.

6. The DC/DC converter of claim 1, wherein
the control circuit includes:
- a resistance whose one end is connected to an output path of the feedback voltage; and
- a transistor connected between the other end of the resistance and the earth, and the control circuit performs a control to invalidate the resistance to decrease the output voltage of the DC/DC converter, in response to input of a certain signal to the transistor, the certain signal being outputted from the detection circuit when the detection circuit detects a magnetic field exceeding the threshold.

7. The DC/DC converter of claim 6, wherein
the control circuit performs the control so as to satisfy VOUTm<VOUT,
where VOUT and VOUTm are given as:

$$VOUT = Vf/bic \times (1+(R1\times((1/R2)+(1/R3)))), \text{ and}$$

$$VOUTm = Vf/bic \times (1+(R1\times(1/R2))),$$

each of R1 and R2 is a resistance value of a resistance of the feedback circuit, used for dividing the output voltage,
R3 is a resistance value of the resistance of the control circuit,
VOUT is the output voltage of the DC/DC converter when there is no or very small external magnetic field, and
VOUTm is the output voltage of the DC/DC converter when the external magnetic field exceeds the threshold, and
Vf/bic is a setting value of the feedback voltage.

8. A display device comprising a DC/DC converter of claim 1.

* * * * *